Sept. 27, 1960 F. G. STEELE 2,954,549

INPUT CONVERSION METHODS AND APPARATUS

Filed May 29, 1956 5 Sheets-Sheet 1

INVENTOR.
FLOYD G. STEELE
BY
Seymour M. Rosenberg
ATTORNEY

INVENTOR.
FLOYD G. STEELE
BY
Seymour M. Rosenberg
ATTORNEY

Sept. 27, 1960 F. G. STEELE 2,954,549

INPUT CONVERSION METHODS AND APPARATUS

Filed May 29, 1956 5 Sheets-Sheet 3

INVENTOR.
FLOYD G. STEELE
BY
Seymour M. Rosenberg
ATTORNEY

Sept. 27, 1960 F. G. STEELE 2,954,549

INPUT CONVERSION METHODS AND APPARATUS

Filed May 29, 1956 5 Sheets-Sheet 4

INVENTOR.
FLOYD G. STEELE
BY
ATTORNEY

Sept. 27, 1960 F. G. STEELE 2,954,549

INPUT CONVERSION METHODS AND APPARATUS

Filed May 29, 1956 5 Sheets-Sheet 5

INVENTOR.
FLOYD G. STEELE
BY
Seymour M. Rosenberg
ATTORNEY

United States Patent Office 2,954,549

Patented Sept. 27, 1960

2,954,549

INPUT CONVERSION METHODS AND APPARATUS

Floyd G. Steele, La Jolla, Calif., assignor to Digital Control Systems, Inc., La Jolla, Calif.

Filed May 29, 1956, Ser. No. 588,078

16 Claims. (Cl. 340—347)

The present invention relates to methods and apparatus for converting an applied variable magnitude input signal into a signal train synchronized with respect to an applied timing signal and non-numerically representing a predetermined function of the input signal, the resultant signal train being adapted for direct entry into certain types of electronic digital computers.

In recent developments in the field of electronic digital computation, computers have been developed in which information as to quantity magnitudes is conveyed, not by voltage magnitudes or by the digits of numbers (as is usually done in the prior art), but is instead conveyed by so-called non-numerical signal trains. Basically in a non-numerical signal train, each successive signal in the signal train represents one of two, or at most three, predetermined numbers; and the value of the signal train is defined as the average value of the numbers represented by the signals of the signal train.

In the numerical code signal trains customarily used in the prior art, each signal represents the digit of a number, its weight being determined by the position of the signal in a time series. In contrast thereto in a non-numerical signal train, each like valued signal in the train has the same weight or significance wherever it may appear. Further the value of the signal train is determined by the average value of the signals contained in the train rather than by the weighted sum of signals arranged to represent the digits of a number.

For example in one form of non-numerical signal train known as a difunction signal train, one signal of the signal train is produced during each period (designated T) of an applied timing signal, each successive signal of the signal train representing either a predetermined number $N_1$ or a predetermined number $N_2$, the value of the signal train being equal to the average value of the numbers represented by the signals of the signal train. Thus in a difunction signal train representing a quantity M, if the number of $N_1$ representing signals is designated as $n_1$ and the number of $N_2$ representing signals is defined as $n_2$, the value of the quantity M defined by the difunction signal train is given by the following formula:

$$M=\frac{n_1N_1+n_2N_2}{n_1+n_2}$$

As an illustration of the nature of a difunction signal train consider a train in which each signal represents either the quantity +1 ($N_1=+1$) or the quantity −1 ($N_2=-1$). Such a difunction signal train can accurately represent all quantities lying between +1 and −1. If for example the train comprises an unbroken string of +1 valued signals and contains no −1 valued signals then the signal train has a value of +1 (since the average value of the signals in the train is equal to +1). Similarly, the signal train has a value of −1 when it comprises an unbroken string of −1 valued signals. A value of zero is represented by the signal train when it comprises alternate +1 and −1 valued signals and in the same manner it can represent intermediate positive or negative values by containing an excess of +1 or −1 valued signals respectively.

In another form of non-numerical signal train, which has been tentatively designated as a trifunction signal train, each signal of the signal train represents one of three possible predetermined numbers $N_1$, $N_2$ or $N_3$, the value of the signal train being found in similar manner as the average value of the numbers represented by the signals of the signal train. Examples of both trifunction and difunction representation are fully described hereinbelow in the specification of the present application.

It has been found that through use of non-numerical signal trains of the type described, the introduction of input formation into a digital computer and transmission of output information from the computer can be very greatly simplified.

For example, in the prior art, for the introduction of an input quantity into the computer, it is customary to form during each sampling or timing period of the computer all of the digits (perhaps ten to twelve digits) of a number which represents that input quantity and then upon demand of the computer to step these digits of the number into the computer either in parallel or in time series. The problem of forming the digits of such an input number at rapid enough rates to present a new number in each timing period has been one of the severest problems of prior art input equipment. Moreover it has been questioned whether much is gained insofar as accuracy or speed of operation is concerned, from the use of an input system of this type since most of the information conveyed and processed is largely redundant in the sense that from one timing interval to the next, because of the relatively low rates of change of most input quantities, only a few of the lowest order digits of the corresponding input numbers will change, thus making it clear that the repetitive supplying of the relatively unvarying higher order digits of the number is unnecessary.

In contrast, if the difunction form (or other non-numerical form) of representation of input quantities as used, the introduction of an input quantity into the computer can be accomplished by supplying in each successive timing period of the computer a single signal of a difunction signal train which represents that quantity. Over a period of many timing periods the computer by means of an internal servoing process is able, in response to the applied difunction, to build up and thereafter maintain a number which very accurately corresponds to the value of the input difunction. (The means by which a computer can thus acquire information conveyed to it by a difunction signal train is fully described in copending U.S. application Serial No. 510,673 entitled "Difunction Computing Elements," by the present inventor.)

As a result of such a mode of operation, the speed requirements laid upon the input-conversion equipment, it is clear, are very greatly reduced. Moreover the effective speed of computation of the computer is often considerably increased through the use of non-numerical signal trains of the described types for the conveying of input information, since the computer is no longer required to process large amounts of redundant information.

Other advantages also arise from the use of non-numerical signal trains in digital computation and control. It has been found that with very simple equipment virtually all computational operations can be directly performed with non-numerical signal trains. For example apparatus for adding and subtracting non-numerical signal trains is described in U.S. Patent No. 2,898,040 for "Computer and Indicator System" issued August 4, 1959, to the present inventor and other apparatus for multiplying and dividing non-numerical signal trains by each other is described in the hereinbefore mentioned copending U.S. application Serial No. 510,673.

The equipment utilized for the performance of these mathematical operations upon non-numerical signal trains is characterized by extraordinary simplicity and requires relatively few components for the mechanization thereof. Thus twofold advantages accrue from the use of non-numerical signal trains for the representation of quantity magnitudes: first, that the formation and transmission of input data to and from the computer is greatly simplified; and secondly that the equipment required for the performance of internal computational operations is reduced in complexity.

Because of the above-described advantages arising from the use of non-numerical signal trains for the representation of quantity magnitudes, a definite need has been created for input-conversion apparatus which can transform applied analog input signals and other input quantities into corresponding non-numerical signal trains. Basically what is required is input-conversion apparatus which can accept such input quantities as the position of a shaft, the magnitude of a voltage or a current etc. and respond to these input quantities by producing and supplying to a computer, a non-numerical signal train which represents a function of the quantity magnitude, the input-conversion device producing one signal of the signal train during each sampling or timing period of the computer. (Ordinarily these timing periods will be defined by a timing signal issued by the computer or by a separate source to which both the input-conversion device and the computer are synchronized.)

One such input-conversion apparatus has already been disclosed in copending U.S. application Serial No. 510,736 entitled "Ordered Time Interval Computing Systems," filed May 24, 1955, by the present inventor. The type of input-conversion apparatus there described may be briefly described as a quantity magnitude to time interval-to signal train conversion apparatus. The device therein described embodied a two-step conversion process in which first an input quantity was transformed into an electrically marked time interval designated $x$ whose duration represented some predetermined function of the input quantity, and next the time interval $x$ was transformed into a difunction signal train having a value proportional to $x$. For example in the conversion of a shaft position to a difunction signal train, a time interval generating circuit was coupled to a shaft so as to produce on demand (in response to an actuating signal) pulses which demarked a time interval whose duration was proportional to the shaft displacement. A succeeding computing circuit utilized these time intervals to produce a difunction signal train directly *proportional to the DURATION* $x$ of the time interval.

This type of input-conversion apparatus had several disadvantages in certain applications thereof. The time-interval generating circuit was unusual in that it could not free-run or oscillate but had to remain quiescent until actuated by the succeeding computing circuit. While it is not difficult to construct a simple, normally quiescent, selectively actuable time-interval generating circuit of the described type, it is rather difficult to obtain really high accuracy of time-interval generation without considerably increasing the number of components in the circuit. Moreover, the scheme required for each conversion the provision of one or more auxiliary time-interval generators to produce so-called "standard" or fixed time intervals which were required in the conversion process. Thus two or three time-interval generators or their equivalent might be required for the conversion of each input quantity into non-numerical signal train form.

According to the present invention another type of input-conversion apparatus is provided which is free from the above-described disadvantages. Basically the input-conversion apparatus of the present invention may be described as a quantity magnitude-to-frequency-to-signal train conversion apparatus. In such a conversion apparatus a two step process is followed in which first a periodic signal is produced whose *frequency* is proportional to a predetermined function of the magnitude of an input quantity, and secondly this periodic signal is transformed into a non-numerical signal train of the described type, whose value is *directly proportional to the FREQUENCY* of the periodic signal produced.

In an input-conversion apparatus of this type, a conventional variable frequency free running oscillator may be utilized, the oscillator being responsive to the magnitude of an applied input signal to produce an output frequency $f_1$ proportional to a predetermined function of that magnitude. Thus the requirement for a normally quiescent selectively actuable signal generator is completely eliminated, thereby greatly simplifying the problems of circuit design and allowing considerably increased accuracy. Moreover in the present input-conversion scheme, generation of auxiliary time intervals or frequencies is not required, so that only a single oscillator need be used for any input quantity.

A further advantage of the input-conversion scheme of the present invention is that often the very quantity which one desires to measure and to introduce into a computer is naturally provided as a signal frequency, as for example vibration or flutter of structural members in aircraft systems, or the frequency of radar pulses in certain types of detection systems. In such instances it is of course desirable to produce a signal train whose value is directly proportional to the *frequency* of the received signals (as is done in the input-conversion scheme of the present invention) rather than proportional to the period (the reciprocal of the frequency) of the received signals as would be done by the input conversion apparatus described in the aforementioned copending U.S. application Serial No. 510,736. Moreover the invention of the present input-conversion apparatus has permitted the effective utilization with non-numerical computers of many instrument pick-off devices, heretofore developed in the prior art which produce variable frequency signals as outputs. For example one well known pressure measuring device utilizes as its metering element a vibrating wire whose frequency of vibration is related to the pressure of surrounding air. An instrument pick-off of this type is of course very readily adopted for use with the input-conversion apparatus of the present invention.

Basically the method which is utilized for transforming the unknown frequency of a series of input signals into a signal train non-numerically representing that frequency is as follows: During each timing interval (as defined by a timing signal which may be issued by a computer or other source) the input signals which occur are counted or accumulated in such a manner as to distinguish between two or at most three successive count values. In addition in each timing interval an output signal is produced, each signal representing a predetermined one of two (or at most three) numbers in accordance with the count value found. The train of output signals thus formed comprises the required non-numerical signal train whose value (the average of the numbers represented by the signals in the train) is proportional to the frequency of the series of applied input signals.

In one embodiment of the invention described hereinbelow, a counter is utilized to receive the applied variable frequency input signals, the counter being constructed so as to be able to distinguish between the successive count values of one and two, the counter thereby determining whether one or two input signals are received during a timing interval. When two input signals are received during an interval, an associated interrogation circuit produces a first output signal representing a predetermined number $N_1=+1$, while on the other hand when only one input signal is received during an interval the interrogation circuit produces a second output signal representing the predetermined number $N_2=-1$. The train of first and second output signals thus formed comprises a difunction signal train whose value, it is shown, is directly proportional to the frequency of the input signals. More specifically, it is shown that the value of the output signal train is directly proportional to the ratio $f_1/f_2$ where $f_1$ is the frequency of the input signals and $f_2$ is the frequency of the timing signal. The value of the output difunction produced by the described embodiment of the invention preserves this linear proportionality to the ratio $f_1/f_2$ so long as the input frequency $f_1$ lies within the range $f_2 \leqq f_1 \leqq 2f_2$.

Still other embodiments of the invention are also shown and described which can accept input frequencies far higher than $f_2$, and are applicable over any desired ranges of input frequency. Full disclosure is also made of one embodiment of the invention, in which the counter utilized distingushes between three successive count values, the output signal train produced comprising signals having three possible values. Thus in this embodiment the non-numerical output signal train formed is of that type which has been previously termed a trifunction signal train.

It is therefore an object of the present invention to provide methods and apparatus for converting an applied variable magnitude input signal into a signal train synchronized with respect to an applied timing signal and non-numerically representing a predetermined function of the magnitude of the input signal.

It is another object of the invention to provide a quantity magnitude-to-frequency-to-non-numerical signal train conversion apparatus for use in supplying input signals to electronic digital computing circuits.

It is yet another object of the invention to provide methods and apparatus for producing a signal train synchronized with respect to an applied timing signal and non-numerically representing the frequency of a series of applied input signals supplied by a variable frequency signal generator.

It is still another object of the invention to provide methods and apparatus for producing a non-numerical signal train which is synchronized with respect to an applied timing signal and whose value is directly proportional to the ratio of the frequency of an applied variable frequency input signal to the frequency of the timing signal.

It is yet another object of the present invention to provide methods and apparatus for operating upon applied variable frequency input signals having a frequency $f_1$ greater than the frequency $f_2$ of an applied timing signal, to produce a non-numerical output signal train having a value directly proportional to $f_1/f_2$, the signal train being synchronized with respect to the applied timing signal.

The novel features which are believed to be characteristic of the invention both as to its organization and method of operation, together with further advantages and objects thereof will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Fig. 1 is a generic block diagram of an input-conversion apparatus according to the invention;

Figs. 2*a* and 2*b* are circuit diagrams of variable frequency signal generators which may be utilized as elements of the input-conversion apparatus shown in Fig. 1;

Figs. 3*a*, 3*b* and 3*c* are waveform charts drawn on a common time scale, illustrating various forms of representation of a difunction signal train;

Figure 1:
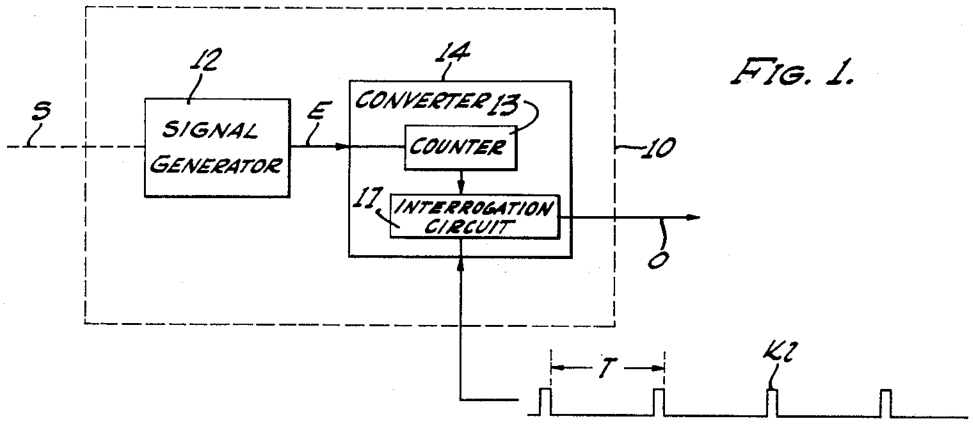

Referring now to the drawings there is shown in Fig. 1, a generic block diagram of an apparatus 10, according to the present invention which is operable for producing an output signal train O non-numerically representing a predetermined function of the magnitude of an applied variable magnitude input signal S, the output signal train O comprising a series of signals synchronized with respect to an applied timing signal K1 of predetermined period T, one signal of output train O being produced during each period T of the applied timing signal K1. The manner in which such a signal train may non-numerically represent a numerical quantity will be explained in detail at a later point in the present specification.

As shown in Fig. 1, apparatus 10 comprises a variable frequency signal generator 12 and a converter 14. Variable frequency signal generator 12 is responsive to input signal S for producing a resultant signal E having a frequency $f_1$ proportional to the predetermined function of the magnitude of signal S. The resultant signal E produced by generator 12 is applied to converter 14 which also receives the applied timing signal K1, converter 14 being responsive to signals E and K1 for producing a series of output signals synchronized with respect to timing signals K1 and non-numerically representing a quantity proportional to the frequency $f_1$ of signal E.

Thus in the overall operation of apparatus 10, signal generator 12 operates to transform the applied variable magnitude input signal S into the signal E having a corresponding variable magnitude frequency $f_1$, while converter 14 operates to convert signal E into the synchronous signal train O (synchronized with respect to timing signal K1) non-numerically representing a quantity proportional to the frequency $f_1$.

Figure 2A:
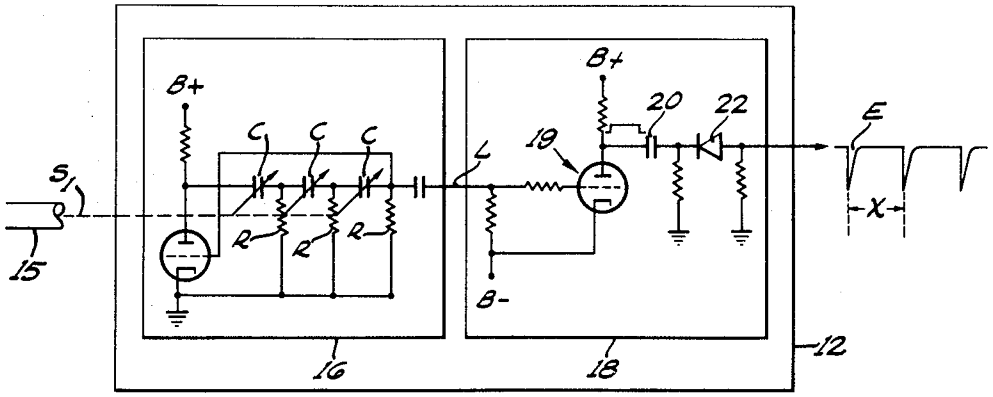
Figure 2B:
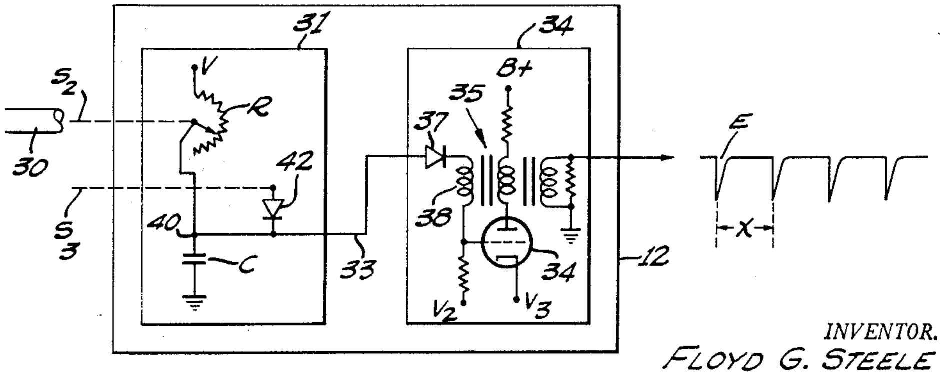

Those skilled in the electronic arts will recognize that many devices are known to the art which can fulfill the functions of generator 12, many devices being known which can produce an output signal having a frequency proportional to a predetermined function, for example, of applied voltage, current amplitude, displacement and other analog quantities. However for purposes of clarification, several preferred embodiments of generator 12 are shown in Figs. 2*a* and 2*b*, by way of exemplification. Referring now to Fig. 2*a* there is shown an embodiment of generator 12 which is responsive to the rotational displacement designated $S_1$ of a rotatable shaft 15 for producing an output signal (the signal E) having a frequency $f_1$ proportional to a predetermined function of $S_1$. As indicated in Fig. 2*a*, signal E comprises a train of sharp electrical pulses recurring at periods *x*, the frequency $f_1$ of signal E being equal therefore to $1/x$.

As shown in Fig. 2*a*, variable frequency signal generator 12 includes a conventional variable frequency phase-shift oscillator 16 which is coupled to shaft 15 and produces a sine wave output signal L whose frequency is varied in accordance with a predetermined function of the displacement of said shaft. The sine wave output signal L is applied to the input of a conventional squaring-and-pulse forming circuit 18 which transforms the sine wave signal L into the sharp electrical pulses which comprise signal E.

Oscillator 16 is of the same general type shown and described at page 111 of the textbook "Waveforms," vol. 19, of the Radiation Laboratory Series published in 1949 by the McGraw-Hill Book Co., and is seen to include in its phase shifting network three identical linearly variable capacitors C being ganged together for common rotation with shaft 15. The frequency of the output signal L is equal to $$\frac{1}{2\pi RC\sqrt{6}}$$

and therefore when the capacitors C are varied in accordance with the rotational displacements $S_1$ of shaft 15, the output frequency of signal L will be proportional to the reciprocal of the rotational displacement of shaft 15. Circuit 18 which receives the sinusoidal signal L includes an overloaded amplifier generally designated 19 which is of the type shown and described at page 10 of the above-referenced textbook "Waveforms," the sine wave signal L being applied to the grid circuit of amplifier 19 which functions to amplify and clip the applied sine waves so as to form a corresponding square wave signal at its plate circuit. The square waves formed in the plate circuit of amplifier 19 are differentiated by being passed through a capacitor 20 to thereby form sharp positive and negative pulses for the rising and falling edges of the plate waveform, the positive pulses being blocked by a rectifier 22 so that only the negative pulses are externally applied as the resultant signal E.

Referring now to Fig. 2*b*, there is shown a second preferred embodiment of variable frequency signal generator 12 which is responsive both to the displacement (designated $S_2$) of a shaft 30 and to a variable voltage (designated $S_3$) for producing a train of sharp output pulses (the signal E) whose repetition frequency $f_1$ (where $f_1=1/x$) is proportional to a predetermined function of $S_2$ and $S_3$. As shown in Fig. 2*b*, generator 12 includes an RC (resistive-capacitive) charging circuit 31 having an output conductor 33 which is coupled to a conventional regenerative amplifier 34. Regenerative amplifier 34 functions as an ordinary multiar circuit which triggers to produce an output pulse whenever the voltage on conductor 33 rises to a predetermined positive voltage level $V_2$. Simultaneously with the production of an output pulse amplifier 33 applies or "kicks back" along conductor 33 a large negative signal which has the effect of discharging charging circuit 33 to the voltage level $S_3$ of the applied input signal. The period $x$ between successive output pulses will therefore correspond to the time required for charging circuit 33 to recharge from the voltage level $S_3$ to the triggering voltage $V_2$, and therefore by varying $S_3$ this charging time is correspondingly varied. Moreover the period $x$ is also directly proportional to the product RC and therefore may also be controlled by varying R or C in accordance with the rotation $S_2$ of shaft 30.

Considering now the detailed structure of charging circuit 31, it is seen that a variable resistance R in the form of a potentiometer controlled by shaft 30 is connected between a terminal 40 and one terminal of a source (not shown) of high positive potential V (the other terminal of this source being grounded) while a capacitor C is connected between terminal 40 and ground. Terminal 40 is also connected to conductor 33 and therethrough to the cathode of a diode 42 whose anode is connected to one terminal of a source of the variable voltage $S_3$.

In the operation of charging circuit 31, the application of a negative "kickback" signal along conductor 33 tends to instantaneously discharge capacitor C to a low voltage level. Diode 42 acts to clamp or limit this negative voltage excursion to the voltage level $S_3$, this voltage level serving as a starting level for the recharging of capacitor C by current flowing into the capacitor through resistor R from the source of voltage V. The period $x$ required for capacitor C to recharge from the voltage level $S_3$ to the triggering level $V_2$ is defined by the following formula:

$$x=RC\log_e\frac{V-S_3}{V-V_2} \tag{1}$$

and therefore the frequency $f_1$ of the output signal E is defined by the following formula:

$$f_1=\frac{1}{x}=\frac{1}{RC\log_e\frac{V-S_3}{V-V_2}} \tag{2}$$

Thus it is clear that the frequency $f_1$ of the output signal E produced by the variable frequency generator 12 shown in Fig 2*b* is inversely proportional to the resistance R (and hence to the shaft displacement $S_2$) and also to the logarithm of the variable voltage $S_3$.

It will be clear to those skilled in the art that many other predetermined functions of applied input signals can be converted to equivalent frequency form in similar manner. For example referring to Fig. 2*b*, the use of non-linear potentiometers (such as a sine-cosine or hyperbolic potentiometers) will permit very nearly any desired function of an input signal to be generated as a frequency proportional to that function.

Considering now how such frequency signals are converted (by converter 14) into a signal train O non-numerically representing the generated frequency $f_1$ of signal E, reference is made again to the generic embodiment of converter 14 which is shown in Fig. 1. As shown in Fig. 1, converter 14 is seen to comprise a counter 13 and an interrogation circuit 17. Counter 13 as indicated in Fig. 1 is responsive to the resultant signals E for continuously counting these signals as they occur. Interrogation circuit 17 is coupled to counter 13 and also receives the applied timing signal K1, the interrogation circuit being responsive to the timing signals K1 for producing a single output signal during each period T of the timing signals in accordance with the count registered or indicated by counter 13, the series of output signals formed by interrogation circuit 17 non-numerically representing a quantity proportional to the frequency $f_1$ of the signal E and thereby comprising the output signal train O. More particularly it will be understood that the value of output signal train O will in general be proportional to the quantity $f_1/f_2$, therefore representing the ratio of the frequency $f_1$ of signal E to the frequency $f_2$ of the applied timing signal K1.

In preferred embodiments of converter 14, the output signal train O produced by converter 14 will have the form of a difunction signal train, in which one signal is produced during each period T of the applied timing signal, each signal representing either a predetermined number $N_1$ or a predetermined number $N_2$, the quantity represented by the signal train being equal to the average value of the numbers represented by these signals. Thus in a difunction signal train representing the quantity M, if the number of $N_1$ representing signals is designated as $n_1$ and the number of $N_2$ representing signals is defined as $n_2$, the value of the quantity M defined by the difunction signal train is given by the following formula:

$$M=\frac{n_1N_1+n_2N_2}{n_1+n_2} \tag{3}$$

A difunction signal train differs from the signal trains commonly used in digital computation in that the numerical weight assigned to successive signals does not correspond to the weighting of successive digits of a number, but is instead restricted to the two values $N_1$ and $N_2$, the value of each signal being intrinsically determined by the nature of the signal rather than by its time position in the series of pulses. Further the value of the signal train is determined by the average of the signals contained in the train, rather than by the weighting sum of signals arranged to represent successive digits of a number. The accuracy of representation of quantities by a difunction signal train is unbounded, for by utilizing a long enough train of signals, the average value of the numbers represented by those signals may be made to approach a desired quantity with any desired degree of accuracy. Moreover the use of fixed and predeterminate beginning and end points is not required for the evaluation of a difunction signal train, since the value of the signal train is relatively independent of the particular beginning and end points utilized.

Difunction signal trains may take numerous equivalent forms, the most common of which are a train of bilevel signals in which the level of a signal during a timing period indicates the value of the signal, a train of bipolar electrical pulses in which the polarity of a pulse in the period indicates the value of the signal, and a train of pulses in which the presence or absence of a pulse during a timing period indicates the value of the signal for that timing period.

Figures 3A, 3B, 3C:
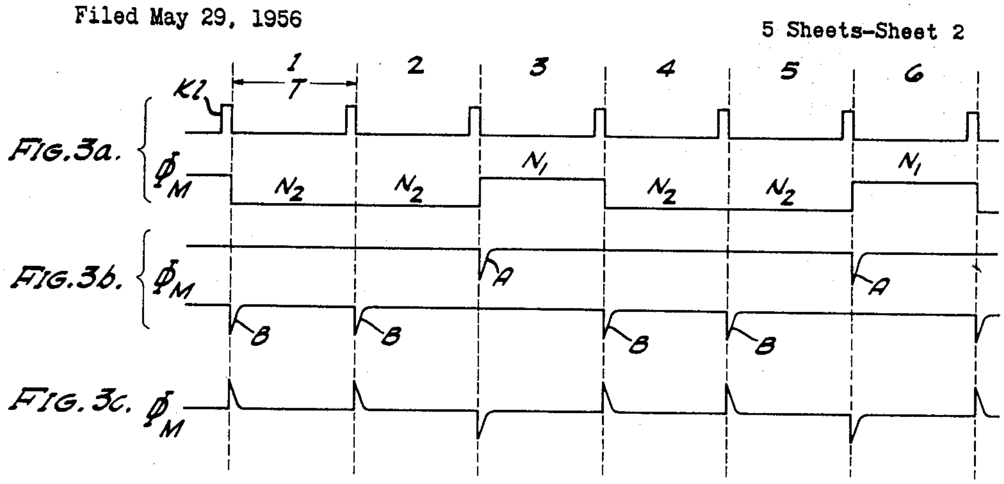

For purposes of example, reference is now made to Figs. 3*a*, 3*b* and 3*c* wherein are shown drawn on a common time scale, waveforms of three equivalent forms of a difunction signal train $\mathcal{D}_M$ representing a quantity M. As shown in Fig. 3*a*, the signal train $\mathcal{D}_M$ comprises signals having a low voltage level representing the number $N_2$ in the first two periods (designated periods 1 and 2) of timing signal K1 and a high voltage level representing the number $N_1$ in period 3 of the timing signal, this pattern of two low level signals and one high level signal repeating during periods 4, 5 and 6, and regularly repeating thereafter.

The average value of an indefinite number of signals of this train will tend to approach the average value of the signals contained in a pattern repetition interval (in this instance a pattern repetition interval is equal to three timing signal periods) and therefore the value M of the signal train $\mathcal{D}_M$ can be defined by the average value of the signals contained within a single pattern repetition interval. Thus by applying Formula 3 to the first three periods of signal train $\mathcal{D}_M$ it is found that:

$$M=\frac{1N_1+2N_2}{3} \qquad (4)$$

If for example $N_1=+1$ and $N_2=-1$ then the value of the quantity M represented by the difunction train $\mathcal{D}_M$ is:

$$M=\frac{1(+1)+2(-1)}{3}=-\frac{1}{3} \qquad (5)$$

The other forms of difunction signal train $\mathcal{D}_M$ shown in Figs. 3*b* and 3*c* are clearly equivalent to that form shown in Fig. 3*a*. In Fig. 3*b* there is shown a form of difunction signal train in which separate signals A and B representing the numbers $N_1$ and $N_2$ respectively are selectively produced during each period, each A signal representing the number $N_1$ and each B signal representing the number $N_2$. In Fig. 3*c* the bipolar forms of representation is shown, each positive pulse representing the number $N_2$ and each negative pulse representing the number $N_1$.

Figures 4, 5:
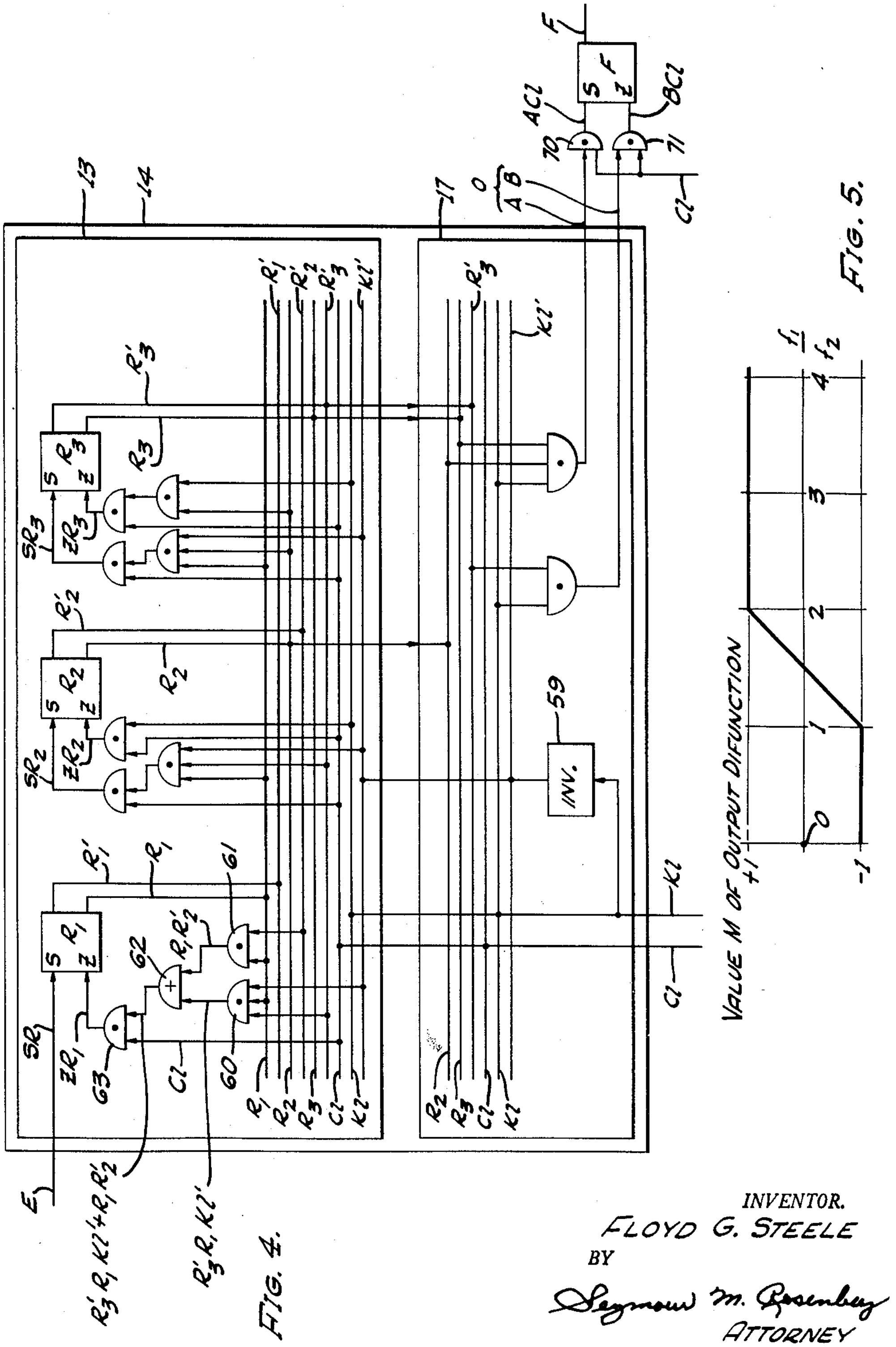
Fig. 4 is a circuit diagram of one embodiment, according to the present invention, of a frequency-to-difunction signal train converter which may be utilized in the input-conversion apparatus shown in Fig. 1.
Fig. 5 is a calibration graph illustrating the output response of the converter shown in Fig. 4 to varying values of input frequency.

Referring now to Fig. 4, there is shown an embodiment of converter 14 wherein counter 13 comprises three flip-flops designated $R_1$, $R_2$ and $R_3$ and a plurality of logical "and" and "or" gating circuits interconnecting these flip-flops so that they function as a counter, having a predetermined count program (to be explained hereinbelow) in response to application of input signals E.

As shown in Fig. 4 the flip-flops $R_1$, $R_2$, $R_3$ each produce complementary output signals designated signals $R_1$ and $R_1'$, $R_2$ and $R_2'$, and $R_3$ and $R_3'$ respectively, each flip-flop having set (S) and zero (Z) inputs and being responsive to signals applied to the set (S) and zero (Z) inputs respectively for being set to its electrical 1 state and its electrical 0 state respectively while simultaneous application of signals to both inputs of a flip-flop causes it to reverse its state. When a flip-flop (as flip-flop $R_1$ for example) is in its electrical 1 state its unprimed output signal ($R_1$) is at a high voltage level while its complementary primed output signal ($R_1'$) is at a low voltage level, these voltage levels being reversed when the flip-flop is in its electrical 0 state.

That form of interrogation circuit 17 which is shown in Fig. 4 is seen to include an inverting amplifier 59 (which is utilized to invert signal K1 to produce a complementary output signal K1′) and several logical "and" gates. As shown in Fig. 4, interrogation circuit 17 is coupled to counter 14 and is responsive to each application of timing signal K1 thereto for producing, in accordance with the count in counter 14, either an output signal designated A (representing the number $N_1=+1$) or an output signal designated B (representing the number $N_2=-1$). The series of A and B output signals formed comprises a difunction signal train having a value proportional to the quantity $f_1/f_2$ (where $f_1$, it will be remembered, is the frequency of signal E and $f_2$ is the repetition frequency of timing signals K1).

As shown in Fig. 4, an auxiliary timing signal *c*1, which is synchronized with respect to signal K1 but has a very much higher repetition frequency than the timing signal K1, is also applied to converter 14. The usages of the auxiliary timing signal *c*1 will be explained at a later point in the present specification.

A calibration graph is provided in Fig. 5 which indicates response of converter 14 to varying values of the frequency $f_1$ of input signal E. In Fig. 5, the value of the output difunction produced by the embodiment of converter 14 shown in Fig. 4 is plotted as an ordinate against the ratio $f_1/f_2$ as an abscissa. It is seen that converter 14 provides a constant $-1$ output difunction value until the frequency $f_1$ of signal E equals the frequency $f_2$ ($f_1/f_2=1$) of timing signal K1. Then over the succeeding range in which the input frequency $f_1$ rises until it is equal to twice the frequency $f_2$ ($f_1/f_2=2$) the value of the output difunction rises linearly from $-1$ to $+1$. For frequencies $f_1$ of signal E greater than twice the frequency $f_2$ of timing signal K1, converter 14 produces a constant $+1$ output signal.

Thus it is seen that the value of the output difunction produced by the converter 14 shown in Fig. 4 is linearly proportional to the frequency $f_1$ of signal E over that frequency range in which $f_2 \leqq f_1 \leqq 2f_2$. Ordinarily therefore, to take best advantage of this output characteristic of converter 14, variable frequency signal generator 12 would be adjusted so as to maintain the frequency of signal E within this range. If such restriction on the frequency range of signal E is made ($f_2 \leqq f_1 \leqq 2f_2$), it is clear that either one pulse or two pulses of signal E will occur during each period T of timing signal K1.

The general procedure which is mechanized by converter 14 of Fig. 4 is that during each period T, the number of pulses occurring in the input signal E are counted and if one pulse has occurred a $-1$ representing output signal (a B signal) is produced while if two pulses have occurred during the period a $+1$ representing output signal (an A pulse) is produced. The series of A and B pulses thus produced, it will be shown, comprises the required output difunction signal train having the values designated by the calibration graph of Fig. 5 for the frequency range $f_1/f_2=1$ to $f_1/f_2=2$. In order to extend the operation of the converter to other frequency ranges in the manner shown by the calibration graph of Fig. 5, the further rules are followed that if no pulses of signal E are received within a period T, a $-1$ representing signal (a B signal) is produced while if more than two pulses are received within the period a +1 representing output signal (an A signal) is produced.

For purposes of example we will consider now the response of converter 14 to an input signal E having a frequency $f_1$ which is equal to $1\frac{1}{3}f_2$ ($f_1/f_2=1\frac{1}{3}$). According to the calibration graph of Fig. 5, the value of the output difunction produced by converter 14 should then be equal to $-\frac{1}{3}$ and it will be shown that this value of the output difunction is in fact produced by converter 14 through operation in accordance with the hereinabove described rules.

Figure 6:
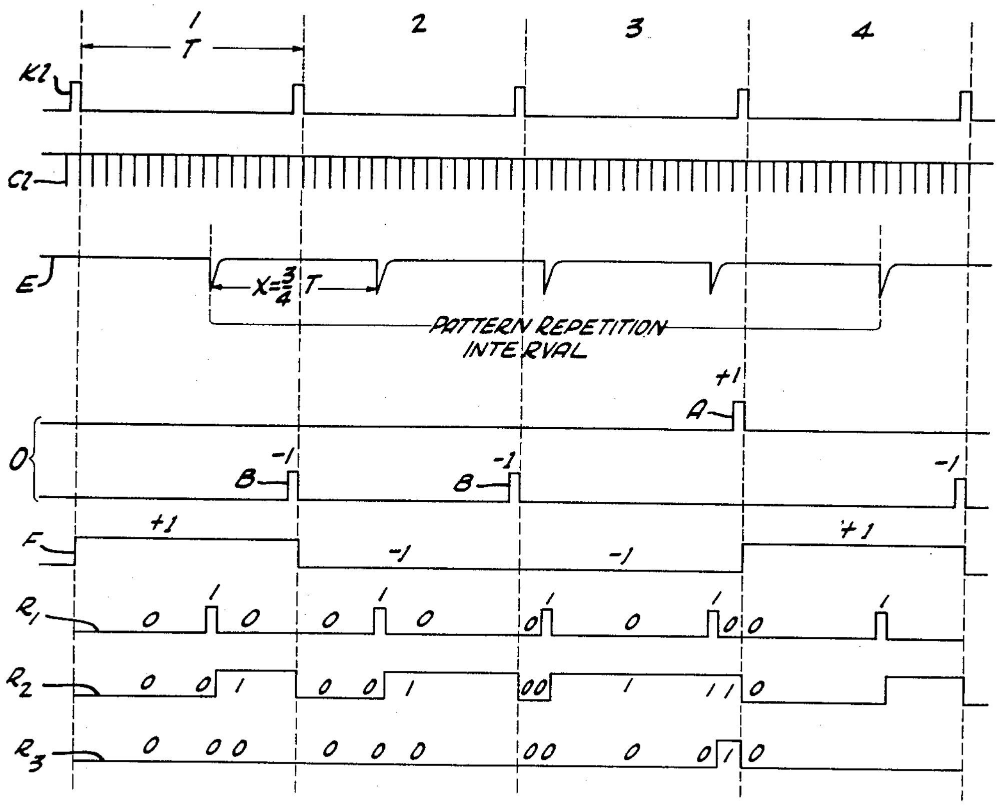
Fig. 6 is a waveform chart showing on a common time scale a number of waveforms which are illustrative of the operation of the converter shown in Fig. 4.

Referring to Fig. 6, there are shown plotted on a common time scale waveforms of the timing signal K1; the auxiliary timing signal *c*1, and a signal E having its frequency $f_1$ equal to the designated value of $1\frac{1}{3}f_2$. Successive periods T of timing signal K1 are designated 1, 2 . . . 4 respectively. Since the frequency $f_1$ of signal E is equal to $1\frac{1}{3}f_2$, the period $x$ of signal E will be equal to $$\frac{1}{1\frac{1}{3}}$$

the period T of timing signal E therefore being equal to ¾T as shown in Fig. 6. Looking now in Fig. 6 at the waveform of signal E, it is seen that single pulses of signal E occurs in periods 1 and 2 while two pulses occur in period 3. In period 4 this pulse pattern begins to repeat again it being clear that the same pulse pattern would recur without change in periods 4, 5 and 6 (periods 5 and 6 not being shown) and in every successive three periods thereafter.

Following the rules provided hereinabove, since only a single pulse occurred in periods 1 and 2, −1 representing signals (B signals) are produced for those periods as shown in Fig. 6, while for period 3, since two pulses were received during the period a +1 representing signal (an A signal) is produced. This pattern of two B signals and one A signal recurs regularly thereafter. The value of the difunction signal train O which comprises signals A and B is therefore defined by the average value of these signals for any successive three periods (a pattern repetition interval) and is therefore equal to $$\frac{1(+1)+2(-1)}{3}$$

or $-\frac{1}{3}$, this being the required value of the difunction signal train as designated by the calibration graph of Fig. 5.

The internal operations of converter 14 which result in the production of the A and B pulses in the manner explained will be described in detail at a later point in this specification. However before conisdering the detailed structure and operation of converter 14, it appears desirable to present a short analytic proof of the efficacy of the hereinbefore explained procedure, mechanized by the described embodiment of converter 14 for transforming frequency into corresponding difunction representation.

In developing this analytic proof it will be assumed for purposes of simplification that the frequency $f_1$ of signal E lies within the range $f_2 \leqq f_1 \leqq 2f_2$, this corresponding to the linear slope portion of the calibration graph of Fig. 5. As explained before within this frequency range only one or two pulses of signal E can be received within a period T, a single pulse causing production of a −1 representing difunction signal (a B signal) and two pulses within a period causing production of a +1 representing signal (an A signal). Since the value of the resultant difunction signal train thus produced may be defined by its value over a single pattern repetition interval, we will consider only a single corresponding pattern repetition interval of signal E.

If we define the number of pulses of signal E occurring within a pattern repetition interval as an integer $p$, then the total length or time duration of a pattern repetition interval is equal to $px$. It should be clear that the length of a pattern repetition interval is equal to the length of an integral number of timing periods T of signal K1. Thus if we designate $n$ as being that integral number of timing periods T whose total length equals a pattern repetition interval we can write the equation:

$$px=nT \qquad (6)$$

As an example, as shown in Fig. 6 there are four ($p=4$) pulses of signal E within its pattern repetition interval, the quantity $4x$ being equal to three T periods ($n=3$) of timing signal K1, so that ($4x=3T$).

We rewrite Equation 6 in a clearly equivalent form, which will be useful hereinbelow.

$$\frac{p}{n}=\frac{T}{x} \qquad (7)$$

Since $p$ pulses of signal E occur within $n$ timing intervals T, the number of timing intervals $n_1$ having two pulses therein must be equal to $(p-n)$. Restating this in equation form:

$$n_1=p-n$$

where $n_1$ is, as previously defined, the number of timing intervals T having two pulses of signal E therein.

The remaining ($n_2$) timing intervals of the $n$ timing intervals T will each have a single pulse of signal E therein. To find $n_2$ we write:

$$n_2=n-n_1 \qquad (8)$$

$$=n-(p-n)=2n-p \qquad (9)$$

Since a +1 representing output signal will be produced for each of the $n_1$ periods, and a −1 representing signal will be produced for each of the $n_2$ periods, the value (designated M) of the output difunction signal train O is defined by Equation 3, developed hereinabove:

$$M=\frac{n_1N_1+n_2N_2}{n_1+n_2} \qquad (3)$$

Substituting values:

$$M=\frac{(p-n)(+1)+(2n-p)(-1)}{n} \qquad (11)$$

$$M=\frac{2p-3n}{n}=2\frac{p}{n}-3 \qquad (12)$$

and substituting for $$\frac{p}{n}$$

from Equation 7:

$$M=2\frac{T}{x}-3 \qquad (13)$$

Since $$T=\frac{1}{f_2} \text{ and } x=\frac{1}{f_1}$$

by substituting these values in Equation 13 it is found that:

$$M=\frac{2f_1}{f_2}-3 \qquad (14)$$

Equation 14, it is clear defines the linear slope region of the calibration graph of Fig. 5, and therefore the required result has been obtained thereby indicating the mathematical correctness of the procedure mechanized by converter 14 of Fig. 4.

Considering now in detail the operation and structure of converter 14 shown in Fig. 4, as explained hereinbefore, counter 13 of converter 14 counts the input pulses of signal E in accordance with a predetermined count program which is set forth in the following table, Table I.

*Table I*

| Program States of— R₁ | R₂ | R₃ | | Value of Output Signal |
|---|---|---|---|---|
| 0 | 0 ↓E | 0 | K1 C1 ⟶ 0 0 0 | −1 (B) |
| 1 | 0 ↓C1 | 0 | K1 C1 ⟶ 0 0 0 | −1 (B) |
| 0 | 1 ↓E | 0 | K1 C1 ⟶ 0 0 0 | −1 (B) |
| 1 | 1 ↓C1 | 0 | K1 C1 ⟶ 1 0 0 | −1 (B) |
| 0 | 1 ↓E | 1 | K1 C1 ⟶ 0 0 0 | +1 (A) |
| 1 | 1 | 1 | K1 C1 ⟶ 1 0 0 | +1 (A) |

Following through the count program shown in Table I, it is indicated that if at the beginning of a period the flip-flops $R_1$, $R_2$ and $R_3$ are each in their 0 electrical state (0 0 0) they remain in that state until a pulse of signal E is received, this having the effect of setting the $R_1$ flip-flop to its 1 state so that the new flip-flop states are 1 0 0 as indicated. The new flip-flops then remain in this 1 0 0 configuration or program state until the occurrence of the next high frequency timing signal C1 whereupon flip-flop $R_1$ is zeroed and flip-flop $R_2$ is set to 1 to place the flip-flops in the state 0 1 0. Assuming the timing signal K1 has not yet appeared, the next or second pulse of signal E sends the flip-flops to the program state 1 1 0 and the following high frequency clock pulse C1 sends the flip-flops to the program state 0 1 1. The third pulse of signal E sends the flip-flops to the program state 1 1 1 in which they will remain indefinitely, assuming a timing signal K1 doesn't appear. As shown in Table I, for any program state the appearance of a timing signal K1 has the effect of producting a +1 or −1 output signal, as indicated, in accordance with the count or program state presented by the flip-flops and also has the effect of resetting the flip-flops either to the program state 0 0 0 or 1 0 0.

The significance of the count program described by Table I will be greatly clarified by considering it in connection with the corresponding waveforms of the output signals (the signals $R_1$, $R_2$, $R_3$) of flip-flops $R_1$, $R_2$, $R_3$ shown in Fig. 6. These waveforms illustrate the response of counter 13 to the particular example of signal E shown in Fig. 6. It is assumed that at the beginning of period 1, flip-flops $R_1$, $R_2$ and $R_3$ are all in their 0 states (the program state 0 0 0), and therefore as shown the output signals $R_1$, $R_2$, $R_3$ are all then at their low levels. Upon the appearance of the single pulse of signal E in period 1, flip-flop $R_1$ is set, raising signal $R_1$ to its high level momentarily. The program state is then 1 0 0.

For purposes of convenience, indications of these program states have been provided in Fig. 6 adjacent corresponding portions of the waveforms of output signals $R_1$, $R_2$, $R_3$. Upon the occurrence of the next high frequency clock signal C1, $R_1$ is zeroed and $R_2$ is simultaneously set, thereby causing a transition to the program state 0 1 0, thus indicating that a single pulse of signal E has been received. The flip-flops remain in this program state until the timing signal K1 appears, signal K1 having the effect of reading the flip-flops to produce a −1 representing signal (the B signal) at that time and also to reset the flip-flops to the 0 0 0 program state so as to begin a new count for period 2. During periods 2 and 4 the same operations are repeated without change. However period 3 is singular in that two pulses of signal E are received within that period.

The successive program states occurring within period 3 are as shown in Fig. 6 and described by Table I:

0 0 0
↓ E
1 0 0
↓ C1
0 1 0
↓ E
1 1 0
↓ C1
0 1 1 K1 C1 ⟶ 0 0 0

The final program state 0 1 1 attained within period 3 indicates that two pulses of signal E have been received during that period and therefore when the signal K1 appears at the end of the period a +1 representing signal (the A signal) is produced.

Probably the most satisfactory and clearest manner of presenting the detailed structure of counter 13 is to develop the logical equations which define the input signals $SR_1$ and $ZR_1$, $SR_2$ and $ZR_2$ and $SR_3$ and $ZR_3$ which as shown in Fig. 4 are applied to the set (S) and zero (Z) inputs of flip-flops $R_1$, $R_2$ and $R_3$ to change the states of these flip-flops in accordance with the count program shown in Table I. As is well known to those skilled in the art, each term of such logical equations bears a one-to-one correspondence to corresponding logical "and" and "or" gates, the logical equations thereby completely defining the structure of the associated gating networks.

Considering first the $SR_1$ input signal it will be remembered, from a consideration of Table I that flip-flop $R_1$ is to be set whenever a pulse signal E appears, no other signal ever affecting the setting of this flip-flop. Therefore $$SR_1 = E \qquad (15)$$

Considering next the $ZR_1$ input signal, it is clear from a consideration of Table I that flip-flop $R_1$ is set to its 0 state upon the appearance of timing signal C1 whenever flip-flop $R_3$ is in its its 0 state (signal $R_3'$ being high) *and* flip-flop $R_1$ is in its 1 state (signal $R_1$ being high) *and* signal $K1'$ is high *or* when flip-flop $R_1$ is in its 1 state ($R_1$ being high) *and* flip-flop $R_2$ is in its 0 state ($R_2'$). Stating this as a logical equation, it is found that:

$$ZR_1 = C1\,[R_3'R_1K1' + R_1R_2'] \qquad (16)$$

where the (+) indicates that the logical "or" gating operation is to be performed upon the signals combined thereby and the absence of a + indicates that the logical "and" operation is to be performed upon the signals.

For example the term $R_3'R_1K1'$ is mechanized as shown in Fig. 4 by a logical "and" gate 60 which receives the signals $R_3'$, $R_1$ and $K1'$ and combines them in accordance with the logical "and" operation to form the signal $R_3'R_1K1'$. The term $R_1R_2'$ is similarly mechanized by a logical "and" gate 61 which combines the signals $R_1$ and $R_2'$ to form a signal $R_1R_2'$. The logical "or" (+) operation is mechanized by a logical "or" gate 63 which combines the signals produced by gates 60 and 61 to form a resultant signal $[R_3'R_1Kl' + R_1R_2']$. Finally this signal and signal C1 are combined by a logical "and" gate 63 to form the required $ZR_1$ signal as defined by Equation 16.

The remaining equations for $SR_2$ and $ZR_2$ and $SR_3$ and $ZR_3$ are presented hereinbelow as derived through inspection of Table I and similarly define and are mechanized by the logical gating structure shown in Fig. 4.

$$SR_2 = C1[R_1R_3'K1'] \quad (17)$$

$$ZR_2 = K1C1 \quad (18)$$

$$SR_3 = C1[R_1R_2K1'] \quad (19)$$

$$ZR_3 = C1[R_2K1] \quad (20)$$

In the same manner referring to interrogation circuit 17, the gating structure for producing the A and B signals may be similarly defined by corresponding logical equations, through inspection of Table I.

$$A = K1\ R_2R_3 \quad (21)$$

$$B = K1\ R_3' \quad (22)$$

For purposes of example, apparatus for the transformation of the output train O of separate A and B output signals into a single equivalent bilevel voltage signal train is illustrated in Fig. 4. The signals A and B are combined with signal C1 in "and" gates 70 and 71 respectively to form signals A C1 and B C1 which are applied to the set (S) and zero (Z) inputs respectively of a flip-flop F. The output signal F produced by this flip-flop in response to the input signals is the desired bilevel voltage waveform, its form being illustrated for purposes of illustration in Fig. 6.

The embodiment of converter 14 described in connection with Figs. 4, 5 and 6 has certain limitations. One limitation which is not immediately obvious is that under some circumstances there may be an ambiguity of operation which occasionally causes false counts to be registered by counter 14, this arising from the fact that when flip-flop $R_1$ is set to its 1 state by a pulse of signal E, the next following clock pulse C1 is supposed to accomplish two separate acts under the control of $R_1$. For example in the transition from 1 0 0 to 0 1 0, the clock pulse C1 is effective to zero flip-flop $R_1$ (with the $ZR_1$ signal) and simultaneously to set flip-flop $R_2$ (with the $SR_2$ signal). If the pulse of signal E occurs very shortly before the arrival of C1, the separate $ZR_1$ and $SR_2$ signals produced may not have full amplitude and therefore if there is any large difference between the triggering sensitivities of flip-flops $R_1$ and $R_2$ one act may be accomplished without the other thereby causing a false count. However through proper electrical design, as for example by using flip-flops with closely matched triggering sensitivities, the number of false counts produced may be reduced to the point at which they are statistically insignificant. Nevertheless, to simplify electrical design it is desirable to provide a counter which is entirely free of any ambiguity of operation.

Another limitation of the embodiment of converter 14 shown in Fig. 4 arises from the fact that it is often desirable to operate with frequencies $f_1$ considerably exceeding $2f_2$, since many variable frequency signal generators operate more stably and reliably at higher frequencies, as for example over the frequency range $3f_2$ to $4f_2$ and other higher frequency ranges.

Figure 7:
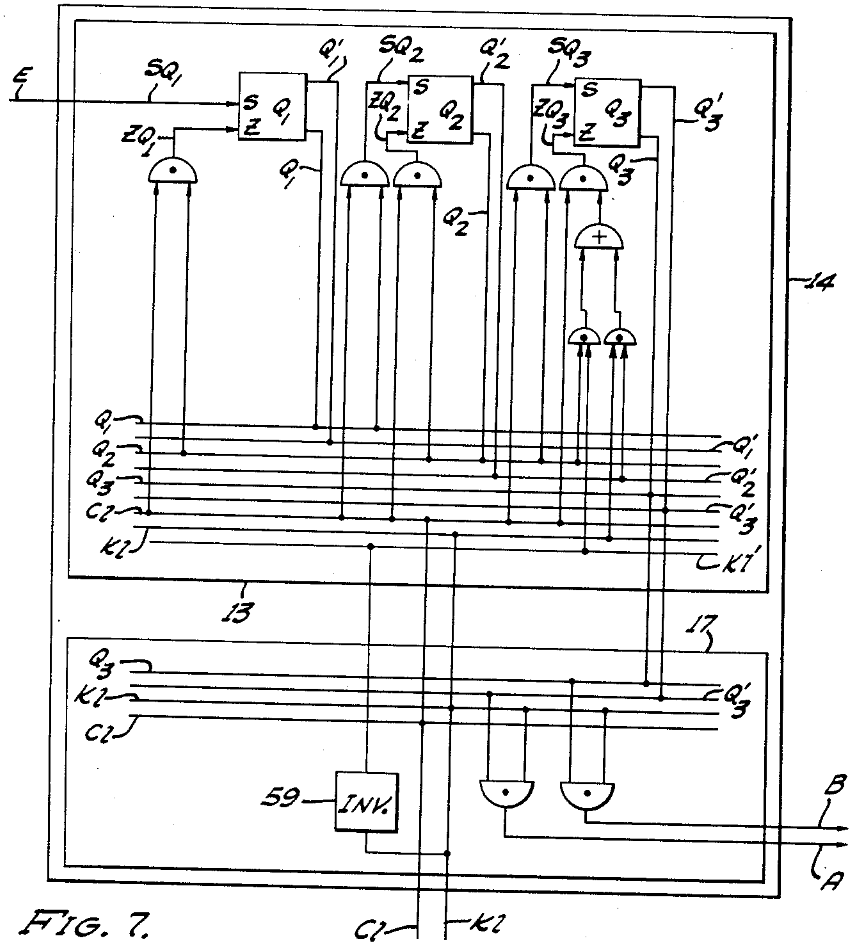
Fig. 7 is a circuit diagram of a modified embodiment, according to the invention, of a frequency-to-difunction converter.

Referring now to Fig. 7 there is shown an improved embodiment of converter 14 which is free from the above described limitations in that it has no ambiguity of operation and is capable of operating over any desired range of frequency. As shown in Fig. 7, counter 13 of converter 14 comprises three flip-flops $Q_1$, $Q_2$ and $Q_3$ each producing complementary output signals $Q_1$ and $Q_1'$, and $Q_2$ and $Q_2'$ and $Q_3$ and $Q_3'$ respectively, each flip-flop having logical "and" and "or" gating circuits connected to its set (S) and zero (Z) inputs to produce setting and zeroing signals $SQ_1$ and $ZQ_1$, $SQ_2$ and $ZQ_2$, and $SQ_3$ and $ZQ_3$ respectively. As further illustrated in Fig. 7, interrogation circuit 17 of converter 14 receives signals $Q_3$ and $Q_3'$ from counter 13 and also the applied timing signal K1, the interrogation circuit being operable for combining these signals to produce the +1 and −1 representing signals A and B respectively which comprise the output difunction signal train.

Figure 8:
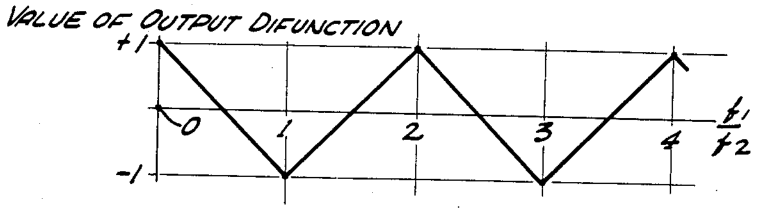
Fig. 8 is a calibration graph illustrating the output response of the converter shown in Fig. 7 to varying values of input frequency.

In Fig. 8, there is provided a calibration graph relating the value of the output difunction produced by converter 14 to the frequency $f_1$ of the signal E applied to the converter. As indicated in Fig. 8 the converter provides linear outputs for literally any desired range of frequency ($f_1$) of signal E, as for example from $2f_2$ to $3f_2$, $3f_2$ to $4f_2$, $4f_2$ to $5f_2$ etc. In the operation of converter 14 shown in Fig. 7, counter 13 in response to pulses of signal E counts these pulses in such a manner as to distinguish between two successive counts occurring within a period T of timing signal K1. For example in the frequency range $1f_2$ to $2f_2$, there can only be, as hereinbefore described, either 1 or 2 pulses of signal E occurring within a period T, and therefore counter 13 in each period attains either a count representing that 1 pulse has been received or a count representing that 2 pulses have been received within the period. Similarly in the frequency range $3f_2$ to $4f_2$, the counter distinguishes between 3 and 4 pulses occurring within a period, and in the frequency range $5f_2$ to $6f_2$ distinguishes between 5 and 6 pulses, etc. To distinguish between 1 and 2 pulses, 3 and 4 pulses, etc. in the described manner, a very simple count-program is utilized distinguishing only whether an odd-or-even number of pulses has been received within each period T.

To obtain the output characteristic described by the calibration graph of Fig. 8, for each period in which an odd number of pulses of signal E is received by the counter, a −1 representing output signal (a B signal is produced) by interrogation circuit 17 which for each period in which an even number of pulses is received a +1 representing signal (an A signal) is produced. In counter 13 a single flip-flop, the $Q_3$ flip-flop, is utilized to register the odd-or-even count, while the remaining flip-flops $Q_1$ and $Q_2$ are utilized as a two stage input buffer which receives each randomly occurring input pulse of signal E and unambiguously delivers it later to flip-flop $Q_3$ as a signal $Q_2$ which is high for one interval of the high frequency clock C1, this momentary high level of signal $Q_2$ serving as a count pulse for input to the odd-even counting flip-flop $Q_3$.

The explanation of the manner in which these operations are carried out will be greatly clarified through reference to the following table, Table II wherein the count program followed by the flip-flop $Q_1$, $Q_2$ and $Q_3$ is set forth.

*Table II*

| Program States of— | | | | Value of Output Signal |
|---|---|---|---|---|
| $Q_1$ | $Q_2$ | $Q_3$ | | |
| 0 | 0 | 0 | | |
| | ↓ E | | | |
| 1 | 0 | 0 | K1 C1 ⟶ 1 1 0 | +1 (A) |
| | ↓ C1 | | | |
| 1 | 1 | 0 | K1 C1 ⟶ 0 0 1 | +1 (A) |
| | ↓ C1 | | | |
| 0 | 0 | 1 | K1 C1 ⟶ 0 0 0 | −1 (B) |
| | ↓ E | | | |
| 1 | 0 | 1 | K1 C1 ⟶ 1 1 0 | −1 (B) |
| | ↓ C1 | | | |
| 1 | 1 | 1 | K1 C1 ⟶ 0 0 1 | −1 (B) |
| | ↓ C1 | | | |
| 0 | 0 | 0 | K1 C1 ⟶ 0 0 0 | +1 (A) |

As indicated by Table II the flip-flops $Q_1$ and $Q_2$ perform their operations independently of $Q_3$ and of timing signal K1.

Flip-flop $Q_1$, as indicated, is set by the first occurring pulse of signal E. Next flip-flop $Q_2$ is set by the next appearing clock signal C1 (under the control of $Q_1$). The next appearing clock pulse C1 resets $Q_1$ and $Q_2$ so that they are in a condition to receive another input pulse. It is seen that flip-flop $Q_2$ therefore remains in its "1" state for only one clock timing interval, this serving to produce an input count to flip-flop $Q_3$. Except as pointed out below, flip-flop $Q_3$ changes state each time that $Q_2$ is in its "1" state, flip-flop $Q_3$ thereby making an odd-even count of the counts transferred to it by $Q_2$. Thus flip-flop $Q_3$ in its "0" state indicates that an even number of counts have been received while flip-flop $Q_3$ in its "1" state indicates that an odd number of counts have been received.

Note in connection with the described buffering action of flip-flops $Q_1$ and $Q_2$ that although $Q_1$ is set at random times by signal $E_1$ it is then utilized to perform only one act, that is to gate the timing signal C1 to set flip-flop $Q_2$. There is therefore no possible ambiguity of operation.

The appearance of a timing signal K1 does not affect in any manner the operations of $Q_1$ and $Q_2$ but does have the effect of reading the state of flip-flop $Q_3$ to produce a $-1$ representing signal (a B signal) if $Q_3$ is in its "1" state. The timing signal K1 also has the effect if $Q_3$ is in its "1" state (assuming $Q_2$ is in its "0" state) of resetting $Q_3$ to its "0" state so as to begin a new count in the next period of timing signal K1. On the other hand, when $Q_2$ is in its "1" state and timing signal K1 appears, $Q_3$ is set to its "1" state so as to effectively count the input signal represented by $Q_2$ being in its "1" state.

The logical equations which define the gating structure of counter 13 and interrogation circuit 17 may be derived from the inspection of Table II in the manner hereinbefore described in connection with Table I. The required logical equations for the $SQ_1$ and $ZQ_1$, $SQ_2$ and $ZQ_2$ and $SQ_3$ and $ZQ_3$ input signals are clearly:

$$SQ_1=E \quad (23)$$

$$ZQ_1=Q_2C1 \quad (24)$$

$$SQ_2=Q_1C1 \quad (25)$$

$$ZQ_2=Q_2C1 \quad (26)$$

$$SQ_3=Q_2C1 \quad (27)$$

$$ZQ_3=C1[Q_2K1'+Q_2'K1] \quad (28)$$

and it is also evident that the output signals A and B produced by interrogation circuit 17 may be defined by the logical equations:

$$A=Q_3'K1 \quad (29)$$

$$B=Q_3K1 \quad (30)$$

Counter 13 and interrogation circuit 17, as shown in Fig. 7 are respectively mechanized in strict accordance with logical Equations 23 to 28 and 29–30 in the manner hereinbefore described.

In many applications of the invention it is desirable to have converter 14 provide linear outputs over wider frequency ranges, as for example to provide a non-numerical signal train having a value proportional to $f_1$ over the frequency ranges $1f_2$ to $3f_2$ and $3f_2$ to $5f_2$ etc. rather than the narrower ranges $1f_2$–$2f_2$, $2f_2$–$3f_2$ etc. An embodiment of converter 14 having this property is shown in Fig. 9 and the calibration graph associated with this embodiment is shown in Fig. 10.

Figures 9, 10:
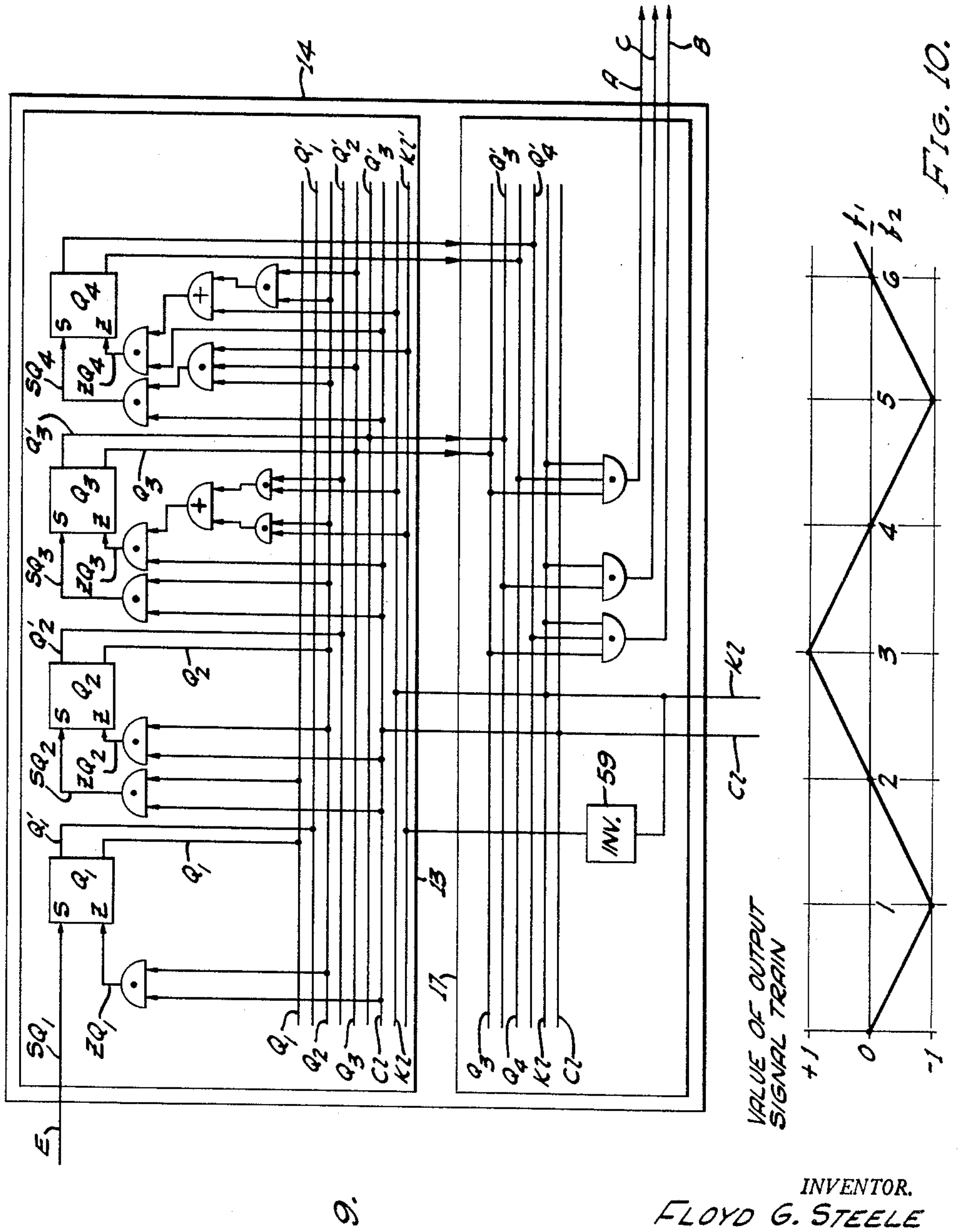
Fig. 9 is a circuit diagram of a frequency-to-trifunction converter in accordance with the present invention.
Fig. 10 is a calibration graph illustrating the output response of the converter shown in Fig. 9.

Considering a portion of the calibration graph shown in Fig. 10, it is seen that the frequency range $1f_2$ to $2f_2$ to $3f_2$ it is desired to have a linearly increasing output value ascending from $-1$ to 0 to $+1$. It will be recognized that over this frequency range either 1, 2 or 3 pulses of signal E will occur during a period of timing signal K1. Counter 13 is constructed so as to distinguish between the three successive counts of 1, 2 and 3 (and between 3, 4, 5, etc.) and interrogation circuit 17 is operable for producing a $-1$ representing signal (a B signal) for a count of 1 received during a period, producing a 0 representing signal (hereinafter designated as a C signal) for a count of 2 received during a period, and for producing a $+1$ representing signal (an A signal) for a count of 3 received during a period. The train of A, B, and C output signals thus formed comprise a non-numerical signal having the desired output value, in that the average of the A, B and C signals produced has the values described by the calibration graph of Fig. 10.

Counter 13 as shown in Fig. 9 is essentially identical to the embodiment shown in Fig. 7 except that an additional flip-flop $Q_4$ has been added so that the two flip-flops $Q_3$ and $Q_4$ can distinguish between three successive counts. As before flip-flops $Q_1$ and $Q_2$ are utilized as an input buffer, the delivery of a count being indicated by $Q_2$ going to its "1" state for a single clock timing interval.

The gating structure associated with flip-flops $Q_1$ and $Q_2$ is therefore identical with that described hereinbefore in connection with Fig. 7, the logical equations defining this gating structure therefore being identical. They are re-presented below for purposes of convenience.

$$SQ_1=E \quad (23)$$

$$ZQ_1=Q_2C1 \quad (24)$$

$$SQ_2=Q_1C1 \quad (25)$$

$$ZQ_2=Q_2C1 \quad (26)$$

The count program of the remaining $Q_3$ and $Q_4$ flip-flops is presented in the following table, Table III.

*Table III*

| Program States of— | | | | | Value of Output Signal |
|---|---|---|---|---|---|
| | | $Q_3$ $Q_4$ | | | |
| 1 0 | ← K1 $Q_2C1$ | 0 0 | K1 $Q_2'C1$ → | 0 0 | 0 (C) |
| | | ↓ $Q_2C1$ | | | |
| 1 0 | ← K1 $Q_2C1$ | 1 0 | K1 $Q_2'C1$ → | 0 0 | −1 (B) |
| | | ↓ $Q_2C1$ | | | |
| 1 0 | ← K1 $Q_2C1$ | 0 1 | K1 $Q_2'C1$ → | 0 0 | 0 (C) |
| | | ↓ $Q_2C1$ | | | |
| 1 0 | ← K1 $Q_2C1$ | 1 1 | K1 $Q_2'C1$ → | 0 0 | +1 (A) |
| | | ↓ $Q_2C1$ | | | |
| | | 0 0 | | | |

As indicated by Table III flip-flops $Q_3$ and $Q_4$ count in response to counts delivered thereby by $Q_2$ in a conventional binary count, automatically resetting therefore on every fourth count. Upon appearance of a timing signal K1, the count attained by the flip-flop is read in the indicated manner, a "0" representing signal (a C signal) being produced for the counts of 0 0 and 0 1, a $-1$ representing signal (a B signal) being produced for the count of 1 0 and a $+1$ representing signal (an A signal) being produced for the count of 1 1. The signal K1 also has the effect of resetting flip-flops $Q_3$ and $Q_4$ so that they can begin a new count for the next timing period. Ordinarily, as indicated, the flip-flops are reset to the state 0 0. However if when K1 appears $Q_2$ is in its "1" state indicating that a count is about to be delivered, in order to avoid losing this count, flip-flops $Q_3$ and $Q_4$ are reset to the state 1 0, the indicated count thus being carried over into the next timing interval.

The logical equations derivable from Table III are presented hereinbelow.

$$SQ_3=Q_2C1 \quad (27)$$

$$ZQ_3=C1[Q_2K1'+Q_2'K1] \quad (28)$$

$$SQ_4=C1[Q_2Q_3K1'] \quad (31)$$

$$ZQ_4=C1[Q_2Q_3+K1] \quad (32)$$

$$A=Q_3Q_4K1 \quad (33)$$

$$B=Q_3Q_4'K1 \quad (34)$$

$$C=Q_3'K1 \quad (35)$$

As is evident from a consideration of Fig. 9, counter 13 there shown is mechanized in strict accordance to Equations 23, 24, 25, 26, 27, 28, 31, and 32 in the manner described hereinabove while interrogation circuit 17 shown in Fig. 9 is similarly mechanized in accordance with Equations 33, 34 and 35.

Although as shown in Fig. 9, three conductors (the conductors along which the signals A, B and C are applied) have been utilized to convey the trifunction information values +1, 0, or −1, it should be understood that this has been done only for purposes of clarification and that actually only two bivalued signals on two conductors are required to convey the trifunction information. For example it can be shown that signals A and B alone are sufficient to convey the required information for it can be considered that signal A at the time K1 is applied constitutes a difunction signal having the significance of +1 (if it is at a high level) or 0 (if it is at a low level) while signal B may similarly be viewed as a difunction signal having the significance of −1 or 0.

Thus A high and B low represents a +1, while B high and A low represents a −1, a 0 being represented by A and B both being low. It will be recognized that in this form of trifunction a positive quantity will ordinarily be represented by the average of the +1's and 0's conveyed as a difunction signal train by signal A while a negative quantity will be represented by the average of the −1's and 0's conveyed as a difunction signal train by signal B. Thus in this form of trifunction representation the required +1, 0, −1 information is inherently conveyed by two difunction signal trains.

An alternative form of trifunction representation may also be utilized which requires only signals A and B, signal B then being viewed as conveying the difunction values of +1 (if it is low) or 0 (if it is high) while signal A is viewed as a sign train indicating whether a + sign or a − sign respectively (in accordance with signal A being high or low) is to be applied to the 1 or 0 difunction values represented by the simultaneously occurring signals B. In this scheme therefore the magnitude of a quantity would ordinarily be represented by the average of the 1 and 0 difunction values represented by signal B taken in conjunction with the simultaneously occurring positive or negative signs represented by signal B.

It will thus be recognized by those skilled in the art, that these types of trifunction signal trains will utilize at least one and possibly two difunction signal trains for the conveying of the required trifunction information.

What is claimed as new is:

1. An apparatus for producing a signal train non-numerically representative of the magnitude of an applied variable magnitude analog signal, the signals of said signal train being synchronized with an applied timing signal of predetermined period T and frequency $f_2$, said apparatus comprising: first means responsive to said analog signal for producing a resultant variable frequency signal having a frequency $f_1$ proportional to a predetermined function of the magnitude of the analog signal; and second means responsive to said resultant variable frequency signal and to said applied timing signal for producing a signal train having a fixed signal occurrence rate corresponding to the frequency $f_2$ and representing a quantity directly proportional to $f_1/f_2$ said signal train comprising a sequence of bivalued signals, each signal having either a predetermined first value or having a predetermined second value, the average of the values of said signals of said train being directly proportional to $f_1/f_2$.

2. An apparatus for producing a difunction signal train representative of the magnitude of an applied variable magnitude analog signal, said apparatus comprising: first means responsive to said analog signal for producing a resultant variable frequency signal having a frequency $f_1$ proportional to the magnitude of said analog signal; and second means responsive to said resultant signal for producing a difunction signal train having a value linearly proportional to the frequency $f_1$.

3. An apparatus for producing a difunction signal train representative of the magnitude of an applied variable magnitude analog signal and synchronized with respect to an applied timing signal of frequency $f_2$, said apparatus comprising: first means responsive to said analog signal for producing a resultant signal having a frequency $f_1$ proportional to the magnitude of said analog signal; and second means responsive to said resultant signal and to said timing signal for producing a difunction signal train having a value linearly proportional to the quantity $f_1/f_2$.

4. An apparatus for producing a difunction signal train representative of the magnitude of an applied variable magnitude analog signal, said apparatus comprising: first means responsive to said analog signal for producing a resultant variable frequency signal having a frequency $f_1$ proportional to the magnitude of said analog signal; and second means responsive to said resultant signal train for producing a difunction signal train having a value linearly proportional to the frequency $f_1$, said difunction signal train comprising successive electrical signals occurring at a predetermined occurrence rate, each signal representing either a predetermined number $N_1$ or a predetermined number $N_2$, the value of the difunction signal train being equal to the average of the numbers represented by the electrical signals in the difunction signal train.

5. An apparatus for producing a difunction signal train representative of the magnitude of an applied variable magnitude analog signal, the signals of said signal train being synchronized with respect to an applied timing signal of predetermined period T and frequency $f_2$, said apparatus comprising: first means responsive to said analog signal for producing a resultant variable frequency signal series having a signal repetition frequency $f_1$ proportional to a predetermined function of the magnitude of said analog signal; and second means responsive to said variable frequency resultant signal series and to said applied timing signal for producing during each period T either a first output signal representing a predetermined first number or a second output signal representing a predetermined second number, the average value linearly of the numbers represented by said output signals being proportional to the quantity $f_1/f_2$, whereby the successive output signals comprise the difunction signal train.

6. The apparatus defined by claim 5 wherein said second means includes a counting circuit for counting the resultant signals occurring during each period T and also includes an interrogation circuit coupled to said counting circuit and responsive to said timing signals for producing during each period T either the first or second output signal in accordance with the count of said counting circuit.

7. The apparatus defined by claim 6 wherein said counting circuit is operable for registering whether an odd or even number of resultant signals occur within each period, and wherein said interrogation circuit includes means for producing during each period T either the first or second output signal in accordance with the odd or even count respectively of said counting circuit.

8. The apparatus defined by claim 5 wherein said second means includes a counting circuit for counting the resultant signals occurring during each period T and also includes an interrogation circuit coupled to said counting circuit and responsive to said timing signals for producing during each period T either the first or second output signal in accordance with the count of said counting circuit, said interrogation circuit producing the first signal whenever a predetermined integral number $n$ of resultant signals are counted within a period T and producing the second signal whenever $n+1$ resultant signals occur within a period T.

9. An apparatus for producing a difunction signal train representing the total displacement of a variable position element, said apparatus comprising: a variable frequency signal generator coupled to said variable position element for producing a series of output signals having a repetition frequency $f_1$ proportional to a function of the total displacement of said element; and a conversion circuit responsive to said resultant signals for producing a difunction signal train having a value linearly proportional to the repetition frequency $f_1$.

10. An apparatus for producing a series of signals, synchronized with respect to an applied timing signal of predetermined period T, and representing a predetermined function of the total displacement of a variable position element, said apparatus comprising: a variable frequency signal generator coupled to the variable position element for producing a resultant signal having a frequency $f_1$ proportional to the predetermined function of the displacement of said element; and means responsive to said resultant signal and to said applied timing signal for producing during each period T either a first output signal representing a predetermined number $N_1$ or a second output signal representing a predetermined number $N_2$, the average value of the numbers represented by said first and second signals being linearly proportional to the frequency $f_1$.

11. An apparatus for producing a series of signals, synchronized with respect to an applied timing signal of predetermined period T, and representing a function of the magnitude of an applied variable magnitude input signal, said apparatus comprising: a variable frequency signal generator responsive to the input signal for producing a resultant signal having a frequency $f_1$ proportional to the function of the magnitude of the input signal, the frequency $f_1$ exceeding the frequency of the timing signal; and means responsive to said resultant signal for producing during each period T either a first output signal representing a predetermined number $N_1$ or a second output signal representing a predetermined number $N_2$, the average value of the numbers represented by said first and second signals being linearly proportional to the frequency $f_1$.

12. In a digital computer input conversion apparatus a conversion device for producing a difunction signal train having a value proportional to the frequency $f_1$ of an applied variable frequency train of input signals, each signal of said difunction signal train being synchronized with an applied timing signal of predetermined period T and frequency $f_2$, the frequency $f_1$ being greater than the frequency $f_2$, said conversion device comprising a counting circuit responsive to said input signals and to said timing signals for counting the input signals occurring during each period T; an interrogation circuit coupled to said counting circuit and responsive to said timing signal for producing during each period T either a first or second output signal in accordance with the count of said counting means, each of said first output signals representing a predetermined number $N_1$ and each of said second output signals representing a predetermined number $N_2$, the average value of the numbers represented by said first and second output signals being linearly proportional to the frequency $f_1$.

13. The conversion device defined by claim 12 wherein said interrogation circuit includes means coupled to said counting circuit and responsive in each period T to said timing signal for producing the first signal if a predetermined integral number $n$ of input signals have been counted by said counting circuit and for producing the second signal if $n+1$ resultant signals have been counted by said counting circuit.

14. The conversion device defined by claim 12 wherein said counting circuit is operable for registering whether an odd or even number of input signals occur within each period and wherein said interrogation circuit includes means for producing during each period T either the first or second output signal in accordance with the odd or even count respectively of said counting circuit.

15. In a digital computer input conversion apparatus, a conversion device for producing a trifunction signal train having a value proportional to the frequency $f_1$ of an applied variable frequency train of input signals, each signal of said trifunction signal train being synchronized with an applied timing signal of predetermined period T and frequency $f_2$, said conversion device comprising: a counting circuit responsive to said input signals for counting the input signals occurring during each period T; an interrogation circuit coupled to said counting circuit and responsive to said timing signal for producing during each period T output signals representing either a first algebraic number $N_1$ or a second algebraic number $N_2$ or a third algebraic number $N_3$ in accordance with the count of said counting circuit, the algebraic average of the numbers represented by said output signals being proportional to the frequency $f_1$ of the input signals.

16. The conversion device defined by claim 15 wherein said interrogation circuit includes means coupled to said counting circuit and responsive in each period T to said timing signals for producing output signals representing the number $N_1$ if a predetermined integral number $n$ of input signals have been counted by said counting circuit and for producing output signals representing either the number $N_2$ or the number $N_3$ if $n+1$ or $n+2$ input signals respectively have been counted by said counting circuit.

References Cited in the file of this patent

UNITED STATES PATENTS

| | | |
|---|---|---|
| 2,428,990 | Rajchman | Oct. 14, 1947 |
| 2,496,912 | Grosdoff | Feb. 7, 1950 |
| 2,656,106 | Stibler | Oct. 20, 1953 |
| 2,665,411 | Frady | Jan. 5, 1954 |
| 2,700,501 | An | Jan. 25, 1955 |
| 2,701,095 | Stibitz | Feb. 1, 1955 |
| 2,733,430 | Steel | Jan. 31, 1956 |
| 2,734,188 | Jacobs | Feb. 7, 1956 |